(12) United States Patent
Bergs et al.

(10) Patent No.: US 12,241,304 B2
(45) Date of Patent: Mar. 4, 2025

(54) SPACER FOR INSULATED GLAZING (71) Applicant: SAINT-GOBAIN GLASS FRANCE, Courbevoie (FR)

(72) Inventors: Bianca Bergs, Gangelt (DE); Christopher Marjan, Aachen (DE); Markus Stahl-Bidinger, Heinsberg (DE); Egbert Schwerdt, Berg (CH)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 351 days.

(21) Appl. No.: 17/923,467

(22) PCT Filed: Apr. 26, 2021

(86) PCT No.: PCT/EP2021/060792
§ 371 (c)(1),
(2) Date: Nov. 4, 2022

(87) PCT Pub. No.: WO2021/224042
PCT Pub. Date: Nov. 11, 2021

(65) Prior Publication Data
US 2023/0184029 A1 Jun. 15, 2023

(30) Foreign Application Priority Data
May 6, 2020 (EP) .................................. 20173128

(51) Int. Cl.
*E06B 3/663* (2006.01)
*B29C 48/793* (2019.01)
(Continued)

(52) U.S. Cl.
CPC ........ *E06B 3/66319* (2013.01); *B29C 48/793* (2019.02); *B29C 48/9115* (2019.02);
(Continued)

(58) Field of Classification Search
None
See application file for complete search history.

(56) References Cited

U.S. PATENT DOCUMENTS 3,759,771 A * 9/1973 Battersby ............ E06B 3/67343
156/244.11
4,113,905 A * 9/1978 Kessler ............... E06B 3/66314
52/786.13
(Continued)

FOREIGN PATENT DOCUMENTS

DE 198 07 454 A1 8/1999
DE 10 2016 115023 A1 6/2017
(Continued)

OTHER PUBLICATIONS

International Search Report as issued in International Phase Application No. PCT/EP2021/060792, dated Jul. 21, 2021.

*Primary Examiner* — Babajide A Demuren
(74) *Attorney, Agent, or Firm* — Pillsbury Winthrop Shaw Pittman LLP (57) ABSTRACT

A spacer for insulated glazings includes a polymeric main body including two pane contact surfaces, a glazing interior surface, an outer surface, and a cavity, wherein the polymeric main body contains a thermoplastic polymer as a base material at a proportion of 30 wt.-% to 70 wt.-%, as an elastomeric additive, a thermoplastic elastomer, and/or a thermoplastic terpolymer having an elastomeric component at a proportion of 0.5 wt.-% to 20 wt.-% in total, and a reinforcing agent at a proportion of 20 wt.-% to 45 wt.-%, the thermoplastic polymer as a base material includes a styrene-based polymer, and the polymeric main body has a foamed pore structure.

20 Claims, 4 Drawing Sheets

(51) Int. Cl.
    *B29C 48/88*     (2019.01)
    *B29K 25/00*     (2006.01)
    *B29K 55/02*     (2006.01)
    *B29K 105/04*     (2006.01)
    *B29L 23/00*     (2006.01)

(52) U.S. Cl.
    CPC ...... *B29K 2025/08* (2013.01); *B29K 2055/02* (2013.01); *B29K 2105/04* (2013.01); *B29L 2023/00* (2013.01)

(56) References Cited

U.S. PATENT DOCUMENTS

| | | | | |
|---|---|---|---|---|
| 4,193,236 | A * | 3/1980 | Mazzoni | E06B 3/66342 52/204.593 |
| 6,457,294 | B1 * | 10/2002 | Virnelson | C08L 101/00 52/786.13 |
| 2003/0148049 | A1 * | 8/2003 | Bayer | E06B 3/66314 428/34 |
| 2005/0100691 | A1 * | 5/2005 | Bunnhofer | E06B 3/66319 428/36.9 |
| 2007/0261325 | A1 * | 11/2007 | Rosskamp | E06B 3/24 52/204.5 |
| 2018/0340365 | A1 | 11/2018 | Kuster et al. | |

FOREIGN PATENT DOCUMENTS

| | | | | |
|---|---|---|---|---|
| EP | 2 930 296 A1 | 10/2015 | | |
| EP | 4386021 A1 * | 6/2024 | ............ | B32B 17/10 |
| WO | WO 2013/104507 A1 | 7/2013 | | |
| WO | WO 2014/198431 A1 | 12/2014 | | |

* cited by examiner

SPACER FOR INSULATED GLAZING

CROSS-REFERENCE TO RELATED APPLICATIONS

This application is the U.S. National Stage of PCT/EP2021/060792, filed Apr. 26, 2021, which in turn claims priority to European patent application number 20173128.8 filed May 6, 2020. The content of these applications are incorporated herein by reference in their entireties.

The invention relates to a spacer for insulated glazings, an insulated glazing including such a spacer, and a method for production thereof.

Insulating glazings have become indispensable in building construction, especially in the wake of ever stricter environmental protection regulations. These are made of at least two panes that are joined to one another via at least one circumferential spacer. Depending on the embodiment, the space between the two panes, referred to as the glazing interior, is air- or gas-filled, but free, in any case, of moisture. Excessive moisture content in the glazing interpane space results, in particular with cold outside temperatures, in condensation of water droplets in the interpane space, which must absolutely be avoided. To absorb the residual moisture remaining in the system after assembly, desiccant-filled hollow-body spacers can be used.

In addition to sealing the interpane space against moisture, another crucial role of the spacer consists in thermal decoupling of the building interior on one side of the insulated glazing and the environment on the opposite side of the insulated glazing. The thermal conductivity of the spacer has a non-negligible influence on the thermal properties of the pane. In one of the known embodiments, spacers are made of a light metal, usually aluminum. These are easy to process; however, the insulating effect of the glazing in the edge region is significantly reduced due to the good thermal conductivity of aluminum (also referred to as the "cold edge" effect).

In order to improve the thermal properties, so-called "warm-edge" solutions for spacers are known. These spacers are made in particular of plastic and, consequently, have significantly reduced thermal conductivity. Compared to spacers made of metal, plastic spacers lack sufficient gas tightness, which, in turn, can be achieved by insulation films applied to the outer surface of the spacers.

WO 2013/104507 A1 discloses a spacer with a polymeric hollow profile main body and an insulation film. In this case, the insulation film contains a polymeric film and at least two metallic or ceramic layers, which are arranged alternatingly with at least one polymeric layer.

In order to reduce the thermal conductivity of polymeric spacers even further, efforts are being made to implement spacers not only as hollow profiles but also to increase the air content within the material. For example, DE 19807454 A1 describes a foamed plastic spacer. Such foamed polymeric spacers can be produced, for example, by adding foaming agents, as shown in EP 2930296 A1.

DE 102016115023 A1 describes a spacer for insulated glazings, the wall of which is porous at least in sub-regions. The plastic material of the profile body is based on a variety of possible polyolefins and can optionally contain reinforcing fibers.

Another foamed spacer is disclosed in EP 2930296 A1. The spacer can comprise various thermoplastic polymers, with polypropylene being preferred.

However, the foaming of the spacer main body has a negative effect on the mechanical properties of the spacer, depending on the direction of the force acting on the spacer. Although foamed spacers often have good mechanical strength, they lack elasticity.

The object of the present invention is to provide a spacer that has low thermal conductivity and, at the same time, high elasticity, an insulated glazing with this spacer, and a method for producing the spacer.

The object of the present invention is accomplished, according to the invention, by a spacer, an insulated glazing with a spacer, and a method for producing the spacer according to the independent claims 1, 11, and 12. Preferred embodiments of the invention emerge from the dependent claims.

The spacer according to the invention for insulated glazings comprises at least a polymeric main body comprising two pane contact surfaces, a glazing interior surface, an outer surface, and a cavity. The polymeric main body is a foamed main body that has a pore structure. A pore structure is a structure with regular cavities that are filled with air. The polymeric main body is made of a thermoplastic polymer as a base material, to which a reinforcing agent is added and an elastomeric additive is admixed. The proportion of the thermoplastic polymer as a base material of the polymeric main body is between 30.0 wt.-% and 70.0 wt.-%, and the proportion of the reinforcing agent is 20.0 wt.-% to 45.0 wt.-%. The thermoplastic polymer as a base material comprises a styrene-based polymer. Furthermore, the polymeric main body includes an elastomeric additive, causing an improvement of the elastic properties of the spacer. A thermoplastic elastomer and/or a thermoplastic terpolymer having an elastomeric component is added as the elastomeric additive. The elastomeric additive has a proportion of 0.5 wt.-% to 20.0 wt.-% in total of the total mass of the main body. Within this order of magnitude, a substantial improvement of the elastic properties of the main body can be observed. As a result, the mechanical properties of the spacer are improved.

The proportions of the individual components of the mixture of the polymeric main body, indicated in percent by weight, add up to 100%, with components other than those just mentioned possibly also present. Examples of such other components are chemical foaming agents and color pigments.

The two pane contact surfaces of the spacer are referred to as the first pane contact surface and the second pane contact surface. The first pane contact surface and the second pane contact surface are the sides of the spacer, on which, during installation of the spacer, the outer panes (first pane and second pane) of an insulated glazing are mounted. The first pane contact surface and the second pane contact surface run parallel to one another.

The glazing interior surface is defined as the surface of the spacer main body that faces in the direction of the interior of the glazing after installation of the spacer in an insulated glazing. The glazing interior surface is located between the first and the second pane.

The outer surface of the spacer main body is the side opposite the glazing interior surface that faces away from the interior of the insulated glazing in the direction of an outer seal.

The outer surface of the spacer can, in a possible embodiment, be angled in each case adjacent the pane contact surfaces, resulting in increased stability of the main body. The outer surface can be angled adjacent the pane contact surfaces, for example, by 30 to 60° in each case, relative to the outer surface.

The cavity of the main body is adjacent the glazing interior surface, with the glazing interior surface situated above the cavity and the outer surface of the spacer situated below the cavity. In this context, "above" is defined as facing the inner interpane space of the insulating glazing in the installed state of the spacer and "below" as facing away from the pane interior.

The cavity of the spacer results in a weight reduction in comparison with a solidly formed spacer and is available to accommodate additional components, for instance, a desiccant.

Preferably, a thermoplastic elastomer or a thermoplastic terpolymer having an elastomeric component is mixed into the main body as an elastomeric additive. Thermoplastic elastomers as an elastomeric additive are preferably added at a proportion of 0.3 wt.-% to 5.0 wt.-%, preferably 0.3 wt.-% to 4.0 wt.-%, while thermoplastic terpolymers having an elastomeric component are used at a proportion of 3.0 wt.-% to 20.0 wt.-%, preferably 4.0 wt.-% to 14.0 wt.-%.

In a preferred embodiment of the spacer according to the invention, a thermoplastic elastomer from the group of thermoplastic polyurethanes (TPU) and/or the group of thermoplastic styrene block copolymers (TPS) is used as an elastomeric additive. In the case of the thermoplastic elastomers TPU and TPS, a proportion of 0.3 wt.-% to 5.0 wt.-% already suffices to bring about the desired improvement in the elastic properties. Particularly preferably, 0.5 wt.-% to 4.0 wt.-%, in particular 1.5 wt.-% to 2.5 wt.-% TPU and/der TPS is added. These small amounts already suffice to achieve sufficient elasticity, wherein in the preferred ranges, better visual appearance of the surface and better stability of the polymer melt during the production of the main body are achieved.

In another preferred embodiment of the spacer according to the invention, the elastomeric additive is a thermoplastic terpolymer having an elastomeric component. The thermoplastic terpolymer is a copolymer of multiple monomer components, wherein at least one monomer component provides the elastic properties of the elastomeric additive. The other monomer components can, for example, be selected such that good compatibility with the base material of the spacer is ensured.

The thermoplastic terpolymers having an elastomeric component are preferably added at a proportion of 3.0 wt.-% to 20.0 wt.-%, preferably 4.0 wt.-% to 20.0 wt.-%, particularly preferably 4.0 wt.-% to 14.0 wt.-%. These ranges have proved to be particularly advantageous in terms of the resulting elasticity of the main body. In particular, as elastomeric additives, ABS and/or ASA are advantageous in this respect.

The thermoplastic terpolymer is preferably realized as acrylonitrile-butadiene-styrene copolymer (ABS), the elastomeric component of which consists in the butadiene portion of the copolymer. As an elastomeric additive to the main body, ABS brings about higher impact strength and elasticity of the material.

ABS has proved to be particularly effective in terms of mechanical properties and elasticity when used at a rate of 4.0 wt.-% to 20.0 wt.-%, particularly preferably 4.5 wt.-% to 13.0 wt.-%, in particular 6.0 wt.-% to 12.0 wt.-% ABS in the main body.

Another preferred embodiment of the invention includes a spacer with a thermoplastic terpolymer having an elastomeric component, with acrylonitrile-styrene-acrylate (ASA) used as the thermoplastic terpolymer. Acrylonitrile-styrene-acrylate refers to a styrene-acrylonitrile copolymer modified with acrylate rubber, wherein, in the context of the invention, the elastomeric component is acrylate rubber. The properties of ASA are basically similar to those of ABS, with similar proportions proving particularly advantageous. ASA is preferably added at a proportion of 4.0 wt.-% to 20 wt.-%, particularly preferably 4.5 wt.-% to 13.0 wt.-%, in particular 6.0 wt.-% to 12.0 wt.-%.

The thermoplastic polymer of the base material comprises, according to the invention, a styrene-based polymer. Styrene-based polymers have proved to be particularly advantageous in terms of the mechanical properties of the main body. A particularly suitable thermoplastic polymer is styrene-acrylonitrile (SAN). However, alternatively, polyethylene (PE), polyethylene terephthalate (PET), polypropylene (PP), or copolymers or mixtures thereof could conceivably be selected as the base material of the main body.

In a particularly preferred embodiment of the spacer, a styrene-based thermoplastic polymer is selected for the base material, with the elastomeric additive containing at least no polypropylene, preferably no olefin-based thermoplastic elastomers (TPO). It has been found that mixtures of styrene-based thermoplastic polymers with propylene as an elastomeric additive can have stability problems of the melt in the extrusion process. This complicates the production process in the sense that precise project control and monitoring are required. Accordingly, the production process is simplified by dispensing with elastomeric additives with polypropylene. Similar effects are to be expected with other olefin-based thermoplastic elastomers such that this group is preferably avoided when selecting the elastomeric additive.

Various processes are known for the foaming of plastic melts, such as the polymer melt for the extrusion of the polymeric main body, which can be categorized as physical, mechanical, and chemical processes. In physical and mechanical processes, a gas is incorporated into the polymer melt solely by physical or mechanical methods. In contrast, chemical foaming processes are based on the decomposition of a blowing agent as a result of the supplying of heat, causing a volatile gaseous component of the blowing agent to split off. The finely dispersed gaseous component created in the melt causes the foaming of the polymer melt. Direct foaming processes are preferably used for producing the spacer according to the invention. The direct foaming processes include foam extrusion, which is preferably used for producing the spacer according to the invention and in which the gas released by the blowing agent causes expansion of the plastic as it emerges from a perforated nozzle. As a result of foaming during extrusion, the walls of the hollow profile are no longer formed as a solid material, but are, instead, penetrated by gas bubbles, hence pore-shaped cavities. The foamed design of the main body is advantageous in terms of the thermal properties of the main body and, at the same time, results in a weight reduction. With regard to the weight reduction, approx. 10% to 20% of the weight is saved compared to a main body implemented as a solid material. The thermal properties are greatly improved by the gases enclosed in the cavities, with the gases resting in the pores acting as a thermal insulator.

Preferably, the spacer according to the invention is foamed by chemical foaming with the addition of a foaming agent. The foaming agent is preferably used in the form of a granulate comprising a carrier material and a blowing agent. When heat is supplied, the blowing agent decomposes in an endothermic reaction with the splitting out of a gaseous substance, preferably $CO_2$. Foaming agents for the chemical foaming of plastics are known to the person skilled in the art and are available commercially. The carrier material is usually a polymer granulate, for example, based on polypropylene, ethylene vinyl acetate (EVA), ethylene butyl acrylate copolymer (EBA), polyethylene (PE), thermoplastic polystyrene (TPS), or thermoplastic polyurethanes (TPU). Preferably, a foaming agent that contains no polypropylene, particularly preferably no olefin-based thermoplastic elastomers (TPO), is used. The granular foaming agent is generally added to the polymer mixture prior to the melting in the extruder.

The foaming agent is preferably added to the polymer mixture of the polymeric main body in an amount of 0.5 wt.-% to 3.0 wt.-%, particularly preferably 0.5 wt.-% to 2.0 wt.-%, in particular 0.8 wt.-% to 1.2 wt.-%. These small amounts are sufficient to obtain the desired porosity of the main body.

The polymeric main body preferably comprises closed-cell pores. The pore size is preferably 10 µm to 100 µm, particularly preferably from 20 µm to 80 µm, in particular from 30 µm to 70 µm. Within these pore sizes, both an advantageous reduction in thermal conductivity and good mechanical stability of the main body can be achieved.

A wide variety reinforcing agents in the form of fibers, powders, or platelets are known to the person skilled in the art as reinforcing agents in polymeric main bodies. Powder and/or platelet reinforcing agents include, for example, mica and talc. Particularly preferred, in terms of mechanical properties, are reinforcing fibers, which include glass fibers, aramid fibers, ceramic fibers, or natural fibers. Alternatively, ground glass fibers or hollow glass spheres are also possible. These hollow glass spheres have a diameter of 10 µm to 20 µm and improve the stability of the polymeric hollow profile. Suitable hollow glass spheres are commercially available under the name "3M™ Glass Bubbles". In one possible embodiment, the polymeric main body contains both glass fibers and hollow glass spheres. An admixture of hollow glass spheres results in further improvement of the thermal properties of the hollow profile.

Particularly preferably, glass fibers are used as reinforcing agents, with these being added at a proportion of 25 wt.-% (weight percent) to 40 wt.-%, in particular at a proportion of 30 wt.-% to 35 wt.-%. Within these ranges, good mechanical stability and strength of the main body can be observed. Furthermore, a glass fiber content of 30 wt.-% to 35 wt.-% Is quite compatible with the multilayer barrier film composed of alternating polymeric and metallic layers applied to the outer surface of the spacer in a preferred embodiment. By adjusting the coefficient of thermal expansion of the polymeric main body and the barrier film or barrier coating, temperature induced stresses between the different materials and flaking of the barrier film or the barrier coating can be avoided.

The main body preferably includes a gas- and vapor-tight barrier film, which serves to improve the gas tightness of the main body. Preferably, this is applied at least on the outer surface of the polymeric main body, preferably on the outer surface and on a part of the pane contact surfaces. The gas- and vapor-tight barrier improves the tightness of the spacer against gas loss and moisture penetration. Preferably, the barrier is applied on approx. one-half to two-thirds of the pane contact surfaces. A suitable barrier film is disclosed, for example, in WO 2013/104507 A1.

In a preferred embodiment, the gas- and vapor-tight barrier on the outer surface of a polymeric spacer is implemented as a film. This barrier film contains at least one polymeric layer as well as a metallic layer or a ceramic layer. The layer thickness of the polymeric layer is between 5 µm and 80 µm, whereas metallic layers and/or ceramic layers with a thickness of 10 nm to 200 nm are used. Within the layer thicknesses mentioned, particularly good tightness of the barrier film is achieved. The barrier film can be applied on the polymeric main body, for example, by gluing. Alternatively, the film can be coextruded together with the main body.

The barrier film particularly preferably contains at least two metallic layers and/or ceramic layers arranged alternatingly with at least one polymeric layer. The layer thicknesses of the individual layers are preferably as described in the preceding paragraph. Preferably, the outer layers are formed by a metallic layer. The alternating layers of the barrier film can be bonded or applied on one another by a large variety of known prior art methods. Methods for depositing metallic or ceramic layers are well known to the person skilled in the art. The use of a barrier film with an alternating layer sequence is particularly advantageous in terms of the tightness of the system. A defect in one of the layers does not result in functional loss of the barrier film. In comparison, even a small defect in a single layer can result in a complete failure. Furthermore, the application of multiple thin layers is advantageous in comparison with one thick layer, since the risk of internal adhesion problems increases with increasing layer thickness. Also, thicker layers have higher conductivity such that such a film is less suitable thermodynamically.

The polymeric layer of the film preferably includes polyethylene terephthalate, ethylene vinyl alcohol, polyvinylidene chloride, polyamides, polyethylene, polypropylene, silicones, acrylonitriles, polyacrylates, polymethyl acrylates, and/or copolymers or mixtures thereof. The metallic layer preferably contains iron, aluminum, silver, copper, gold, chromium, and/or alloys or oxides thereof. The ceramic layer of the film preferably contains silicon oxides and/or silicon nitrides.

In an alternative preferred embodiment, the gas- and vapor-tight barrier is preferably implemented as a coating. The coating contains aluminum, aluminum oxides, and/or silicon oxides and is preferably applied by a PVD method (physical vapor deposition). Coating with the materials mentioned provides particularly good results in terms of tightness and, additionally, exhibits excellent properties of adhesion to the materials of the outer seal used in insulated glazings.

In a particularly preferred embodiment, the gas- and vapor-tight barrier has at least one metallic layer or ceramic layer that is implemented as a coating and contains aluminum, aluminum oxides, and/or silicon oxides and is preferably applied by a PVD method (physical vapor deposition).

Preferably, the glazing interior surface of the spacer has at least one opening. Preferably, a plurality of openings are made in the glazing interior surface. The total number of openings depends on the size of the insulated glazing. The openings connect the cavities to the inner interpane space, enabling a gas exchange between them. This allows absorption of atmospheric humidity by a desiccant situated in the cavities and thus prevents fogging of the panes. The openings are preferably implemented as slits, particularly preferably as slits with a width of 0.2 mm and a length of 2 mm. The slits ensure optimum air exchange without desiccant being able to penetrate out of the cavities into the inner interpane space.

The spacer preferably has, along the pane contact surfaces, a height of 5 mm to 15 mm, particularly preferably of 5 mm to 10 mm.

The width of the glazing interior surface, or the width of the sub-regions of the glazing interior surface, which defines the distance between two adjacent panes of the insulated glazing, is 4 mm to 30 mm, preferably 8 mm to 16 mm.

The spacer described including a first pane contact surface and a second pane contact surface is suitable both for double and triple and multiple glazings. To accommodate multiple panes, it is possible to use either additional spacers or a spacer main body suitable in its shape to accommodate multiple panes. In the first case, a first and a second pane are first attached to the pane contact surfaces of the spacer and, then, further spacers are attached to one of the surfaces of the panes facing away from the spacer, the exposed pane contact surfaces of which accommodate further panes. In the alternative embodiment, a triple or multiple insulated glazing can also be implemented with a spacer in the form of a double spacer. Such a double spacer can accommodate at least one additional pane in a groove. For example, a spacer for triple glazings has a groove in the glazing interior surface between the first pane contact surface and the second pane contact surface, in which a third pane is inserted between the first pane and the second pane. The first and the second pane are attached to the first and second pane contact surface of the spacer. Since the groove extends between the first glazing interior surface and the second glazing interior surface, it delimits them laterally and separates a first cavity and a second cavity from one another. The lateral flanks of the groove are formed by the walls of the first cavity and the second cavity. Such basic spacer forms are known from, among others, WO 2014/198431 A1.

The invention further includes an insulated glazing with a spacer according to the invention. The insulated glazing includes at least a first pane, a second pane, and a circumferential spacer according to the invention surrounding the panes.

The glazing interior of the insulated glazing is situated adjacent the glazing interior surface of the spacer. On the other hand, the outer surface of the spacer is adjacent the outer interpane space. The first pane is attached to the first pane contact surface of the spacer; and the second pane, to the second pane contact surface of the spacer.

The first and the second pane are attached to the pane contact surfaces preferably via a sealant that is applied between the first pane contact surface and the first pane and/or the second pane contact surface and the second pane.

The sealant preferably contains butyl rubber, polyisobutylene, polyethylene vinyl alcohol, ethylene vinyl acetate, polyolefin rubber, polypropylene, polyethylene, copolymers, and/or mixtures thereof.

The sealant is preferably introduced with a thickness of 0.1 mm to 0.8 mm, particularly preferably 0.2 mm to 0.4 mm into the gap between the spacer and the panes.

The outer interpane space of the insulated glazing is preferably filled with an outer seal. This outer seal serves primarily for bonding the two panes and thus for mechanical stability of the insulated glazing.

The outer seal preferably contains polysulfides, silicones, silicone rubber, polyurethanes, polyacrylates, copolymers, and/or mixtures thereof. Such materials have very good adhesion to glass such that the outer seal ensures secure bonding of the panes. The thickness of the outer seal is preferably 2 mm to 30 mm, particularly preferably 5 mm to 10 mm.

In a particularly embodiment of the invention, the insulated glazing includes at least three panes, with a further spacer frame attached to the first pane and/or the second pane, to which frame the at least third pane is attached. In an alternative embodiment, the insulated glazing includes a double spacer with a groove, into which groove the third pane is inserted. The first and the second pane rest against the pane contact surfaces.

The first pane, the second pane, and/or the third pane of the insulated glazing preferably contain glass, particularly preferably quartz glass, borosilicate glass, soda lime glass, and/or mixtures thereof. The first and/or second pane of the insulated glazing can also include thermoplastic polymeric panes. Thermoplastic polymeric panes preferably include polycarbonate, polymethyl methacrylate, and/or copolymers and/or mixtures thereof. Additional panes of the insulated glazing can have the same composition as mentioned for the first, second, and third pane.

The first pane and the second pane have a thickness of 2 mm to 50 mm, preferably 2 mm to 10 mm, particularly preferably 4 mm to 6 mm, with the two panes possibly even having different thicknesses.

The first pane, the second pane, and other panes can be made of single-pane safety glass, thermally or chemically toughened glass, float glass, extra-clear low-iron float glass, colored glass, or laminated safety glass including one or more of these components. The panes can have any other components or coatings, for example, low-E layers or other solar protection coatings.

The outer interpane space, delimited by the first pane, the second pane, and the outer surface of the spacer, is filled at least partially, preferably completely, with an outer seal. Very good mechanical stabilization of the edge seal is thus achieved. Furthermore, the seal surrounds the pressure equalization body and protects it in this manner against mechanical action from the outside.

Preferably, the outer seal contains polymers or silane-modified polymers, particularly preferably organic polysulfides, silicones, room-temperature-vulcanizing (RTV) silicone rubber, peroxide-vulcanizing silicone rubber, and/or addition-vulcanizing silicone rubber, polyurethanes, and/or butyl rubber.

The sealant between the first pane contact surface and the first pane, or between the second pane contact surface and the second pane, preferably contains a polyisobutylene. The polyisobutylene can be a cross-linking or non-cross-linking polyisobutylene.

The insulated glazing is optionally filled with a protective gas, preferably with a noble gas, preferably argon or krypton, which reduce the heat transfer value in the insulated glazing interpane space.

In principle, a wide variety of geometries of the insulated glazing are possible, for example, rectangular, trapezoidal, and rounded shapes. For producing round geometries, the spacer can, for example, be bent in the heated state.

At the corners of the insulated glazing, the spacers are linked to one another, for example, via corner connectors. Such corner connectors can be implemented, for example, as molded plastic parts with a seal, in which two spacers abut.

In another preferred embodiment, the spacer is not separated at the corners of the glazing and connected at the required angle by corner connectors, but, instead, is bent into the corresponding corner geometry under heating.

The invention further includes a method for producing a spacer according to the invention, comprising the steps:
  a) Providing a mixture of at least thermoplastic polymer as base material, elastomeric additive, reinforcing agent, and foaming agent,
  b) Melting the mixture in an extruder at a temperature of 200° C. to 240° C.,
  c) Decomposing the foaming agent under the effect of temperature, d) Discharge of the melt from the extruder through a mold and forming a spacer main body,
e) Stabilizing the spacer, and
f) Cooling the spacer,
wherein, in step a), the thermoplastic polymer as a base material comprises a styrene-based polymer.

The polymeric components of the mixture in step a), i.e., thermoplastic polymer and elastomeric additive, are preferably provided in the form of granules. As a result, these can be readily metered and easy to handle. The reinforcing agent is in fiber or spherical form, i.e., is also easy to meter. The reinforcing agent can also be provided together with the thermoplastic polymer. Such mixtures of thermoplastic polymers with a defined reinforcing agent content are commercially available. Suitable foaming agents in the form of a granulate comprising a carrier material and a blowing agent can be purchased commercially. The blowing agent is applied to the surface of the granular carrier material. The concentration of the blowing agent on the carrier material can vary and is often between 15 wt.-% and 30 wt.-%, for example, 20 wt.-% or 25 wt.-%.

Preferably, the mixture provided in in step a) includes color pigments and/or additives, particularly preferably, at least color pigments. The color pigments are provided in the form of a polymer-bound color pigment in which the color pigment is compressed with the thermoplastic base material used in the form of granules. These granules, also referred to colloquially as a "color masterbatch" improve the meterability of the color pigments and increase the technical process reliability. A polymer-bound color pigment is optionally added to the mixture in step a) at a proportion of 1.0 wt.-% to 4.0 wt.-%, depending on the coloration desired.

In a preferred embodiment of the method according to the invention, in step a) styrene-acrylonitrile is used as a base material, while the elastomeric additive is a thermoplastic elastomer from the group of thermoplastic polyurethanes (TPU) and/or the group of thermoplastic styrene block copolymers (TPS) and is added at a proportion of 0.3 wt.-% to 5 wt.-%. Particularly preferably, the mixture is composed of thermoplastic polymer as a base material at a proportion of 30 wt.-% to 70 wt.-%, elastomeric additive at a proportion of 0.3 wt.-% to 5 wt.-%, and glass fibers as a reinforcing agent at a proportion of 30 wt.-% to 40 wt.-%. The foaming agent is added at a proportion of 0.5 wt.-% to 2 wt.-%. During the melting in the extruder, this mixture exhibits good compatibility of the components with one another and good process stability.

In another embodiment of the method according to the invention, in step a) styrene-acrylonitrile is used as a base material, wherein the elastomeric additive is acrylonitrile-butadiene-styrene copolymer (ABS) and/or acrylonitrile-styrene-acrylate (ASA) and is added at a proportion of 4.0 wt.-% to 20.0 wt.-%. Preferably, a mixture of SAN as thermoplastic base material is used at a proportion of 30 wt.-% to 70 wt.-%, elastomeric additive at a proportion of 4.0 wt.-% to 20.0 wt.-%, and glass fibers as reinforcing agent at a proportion of 30 wt.-% to 40 wt.-%. The foaming agent is added at a proportion of 0.5 wt.-% to 2.0 wt.-%.

A preferred embodiment of the invention is a method, wherein the mixture is melted in an extruder at a temperature of 200° C. to 240° C., preferably 215° C. to 220° C. At these melting temperatures, very good results are obtained in terms of the pore structure of the foamed spacers.

Preferably, the melt is foamed using a foaming agent that decomposes endothermically under the effect of temperature, with the release of $CO_2$.

To form the main body, the melt is preferably shaped into a hollow profile through a mold using a melt pump. The main body is stabilized based on the not yet solidified main body profile using a vacuum calibration tool. This ensures the geometry of the main body. The main body is then preferably passed through a cooling bass and cooled to approx. room temperature.

In a preferred embodiment of the method according to the invention, a gas- and vapor-tight barrier film is applied to the outside of the main body. Preferably, this is coextruded with or bonded to the main body, particularly preferably bonded.

The spacer produced by means of the method according to the invention can be used in a method for producing an insulated glazing. Such a method comprises at least the steps:
g) Providing spacers according to the invention,
h) Assembling a spacer frame from spacers according to the invention,
i) Attaching a first pane to the first pane contact surface of the spacer frame via a sealant, Attaching a second pane to the second pane contact surface of the spacer frame via a sealant,
j) optionally: Attaching at least one further spacer frame to the first pane and/or to the second pane and Attaching a third and, optionally, further panes to the further spacer frames,
k) Pressing the pane assembly,
l) Introducing an outer seal into the outer interpane space.

The bonding of the panes to the pane contact surfaces per step i) can be carried out in any order. Optionally, the bonding of the two panes to the pane contact surfaces can also be done simultaneously.

In step l), the outer interpane space is at least partially, preferably completely, filled with an outer seal. The outer seal is preferably extruded directly into the outer interpane space, for example, in the form of a plastic sealing compound.

Preferably, the glazing interior between the panes is filled with a protective gas before the pressing of the assembly (step k).

The invention is explained in detail in the following with reference to drawings. The drawings are purely schematic representations and not to scale. They in no way restrict the invention. They depict.

Figure 1:
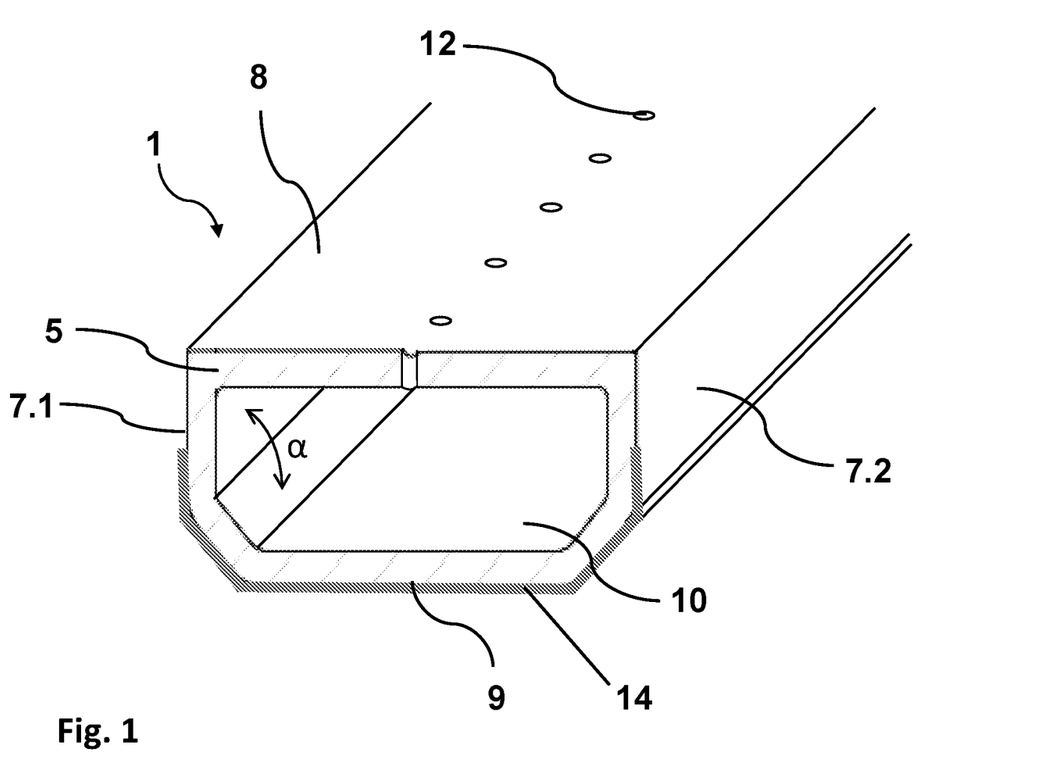
FIG. 1 a schematic representation of the spacer according to the invention in cross-section, FIG. 2 a force-displacement diagram from compression tests of foamed spacers with various elastomeric additives in comparison with an unfoamed spacer, FIG. 3a a schematic representation of an insulated glazing with a spacer according to the invention in cross-section, FIG. 3b the insulated glazing of FIG. 3a in plan view, FIG. 4 a flow chart of a possible embodiment of the method according to the invention.

FIG. 1 depicts a schematic representation of the spacer 1 according to the invention comprising a polymeric main body 5 with two pane contact surfaces 7.1 and 7.2, a glazing interior surface 8, an outer surface 9, and a cavity 10. The outer surface 9 has an angled shape, wherein the sections of the outer surface adjacent the pane contact surfaces 7.1 and 7.2 are inclined at an angle of α=45° relative to the pane contact surfaces 7.1 and 7.2. This improves the stability of the main body 5. A water- and vapor-tight barrier film 14 that reduces the heat transfer through the polymeric main body 5 into the glazing interior of an insulated glazing is applied on the outer surface 9 of the spacer 1. The barrier film 14 comprises three polymeric layers of polyethylene terephthalate with a thickness of 12 µm and three metallic layers of aluminum with a thickness of 50 nm. The metallic layers and the polymeric layers are in each case applied alternatingly, with the layer of the barrier film 14 facing the outer interpane space of the insulated glazing in the installed state of the spacer being a metallic layer. The barrier film 14 is bonded to the main body 5. The cavity 10 is suitable for being filled with a desiccant. The glazing interior surface 8 of the spacer I has openings 12, which are made at regular intervals circumferentially along the glazing interior surface 8 to enable a gas exchange between the interior of the insulated glazing and the cavity 10. Thus, any humidity present in the interior is absorbed by the desiccant 11. The openings 12 are preferably implemented as slits with a width of 0.2 mm and a length of 2 mm. The material thickness (thickness) of the walls of the main body 5 is roughly the same circumferentially and is, for example, 1 mm. The main body has, for example, a height of 6.5 mm and a width of 15 mm.

The mixture from which the main body 5 of FIG. 1 was extruded comprises styrene-acrylonitrile as a thermoplastic base material at a proportion of 30 wt.-% to 35 wt.-% glass fibers, as an elastomeric additive, a thermoplastic polyurethane (TPU) at a proportion of 2.0 wt.-%, and 1.0 wt.-% of a foaming agent. The main body 5 has pours in a size of 30 µm to 70 µm. The main body 5 had good mechanical strength, reduced thermal conductivity, and reduced weight. TPU as a thermoplastic polyurethane causes a substantial improvement of the elastic properties of the main body 5 such that the risk of fracture of the main body 5 under mechanical stress is reduced.

Figure 2:
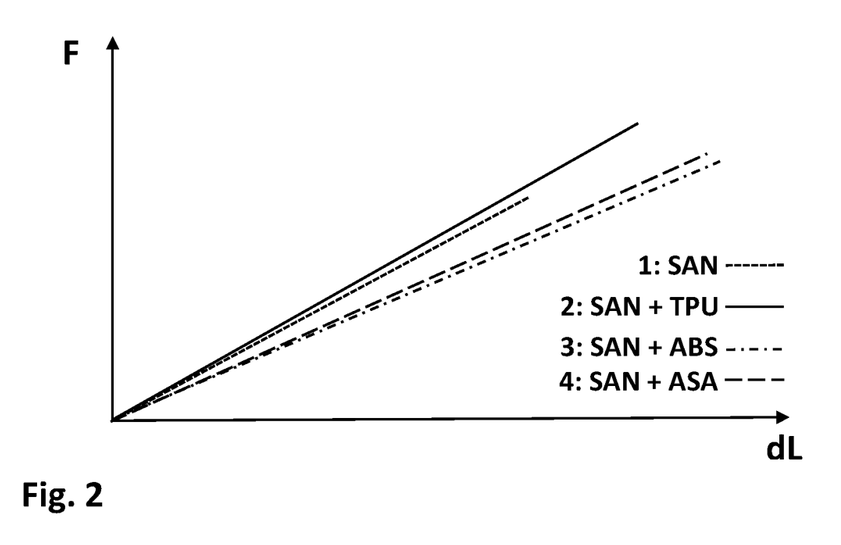

FIG. 2 depicts a sketched force-displacement diagram that was produced on the basis of compression tests with foamed spacers with various elastomeric additives compared with tests with an unfoamed spacer. The inventors carried out tests with various mixtures and a spacer according to FIG. 1 made therefrom. The straight lines obtained show a dependence on selection of the elastomeric additive as well as on the dosage of the elastomeric additive. The illustration in FIG. 2 is based on tests carried out by the inventors, with a generalization having been made in order to make a qualitative statement independent of the exact dosage of the elastomeric additive. FIG. 2 shows the following data series:
1: San Data Series 1 with the designation SAN depicts the behavior of a main body made of styrene-acrylonitrile as a base material with 35 wt.-% glass fibers. The main body is not foamed. Data Series 1 serves as a Comparative Example.

A behavior according to Data Series 1 is shown by the main body made from a mixture of 98.5 wt.-% styrene-acrylonitrile (SAN) with a content of 35 wt.-% glass fibers, to which 1.5 wt.-% of a color masterbatch is added.
2: San+Tpu Data Series 2 with the designation SAN+TPU (Example 2) illustrates the course of the force-displacement curve with the use of a foamed main body with SAN as a base material, 35 wt.-% glass fibers and thermoplastic polyurethane (TPU) as an elastomeric additive. For example, a mixture of 95.5 wt.-% styrene-acrylonitrile (SAN) with 35 wt.-% glass fibers, to which 2.0% TPU, 1.0% foaming agent, and 1.5 wt.-% of a color masterbatch are added.
3: San+Abs Data Series 3 with the designation SAN+ABS (Example 3) represents the behavior of foamed main bodies based on styrene-acrylonitrile, 35 wt.-% glass fibers, and acrylonitrile-butadiene-styrene copolymer (ABS) as an elastomeric additive.

Exemplary for Data Series 3 is a mixture of 92.5 wt.-% styrene-acrylonitrile (SAN) with 35 wt.-% glass fibers, to which 8.0 wt.-% ABS, 1.0 wt.-% foaming agent, and 1.5 wt.-% of a color masterbatch are added.
4. San+Asa Data Series 4 with the designation SAN+ASA (Example 4) represents the behavior of foamed main bodies based on styrene-acrylonitrile, 35 wt.-% glass fibers and acrylonitrile-styrene-acrylate (ASA) as an elastomeric additive.

Exemplary for Data Series 4 is a mixture of 89.5 wt.-% styrene-acrylonitrile (SAN) with 35-wt.-% glass fibers and 8.0 wt.-% ASA, to which 1.0 wt.-% foaming agent and 1.5 wt.-% of a color masterbatch are added.

The mixtures according to Comparative Example and the embodiments according to the invention of Examples 2, 3 and 4 were in each case fed as granules to the extruder and melted in the extruder at a temperature of 215° C. to 220° C. The melt was formed by a melt pump through a mold to form a spacer according to FIG. 1. The still soft hollow profile is stabilized in a vacuum calibration tool and then passed through a cooling bath.

Using the specimens from Comparative Example, Example 2, Example 3, and Example 4, force/strain measurements were carried out by clamping the specimens between two test jaws and the test jaws were moved toward each other until the specimen breaks. The maximum force F that can be applied to the specimen until the specimen breaks can be seen in the force-displacement diagram of FIG. 2 as the break in the straight line. The distance that the two test jaws must travel until the main body breaks can be read from the x-axis marked with the length dL.

In the force-displacement diagram of FIG. 2, it can be seen that using TPU as an elastomeric additive (Example 2), a higher maximum force F can be applied to the spacer before breakage occurs compared with the Comparative Example. In comparison, the maximum force achievable by ABS or ASA as an elastomeric additive (Examples 3 and 4) is slightly reduced compared to the Comparative Example; however, the test jaws can travel a longer distance.

The inventors' tests show that the use of an elastomeric additive increases the flexibility of the spacer.

Figure 3A:
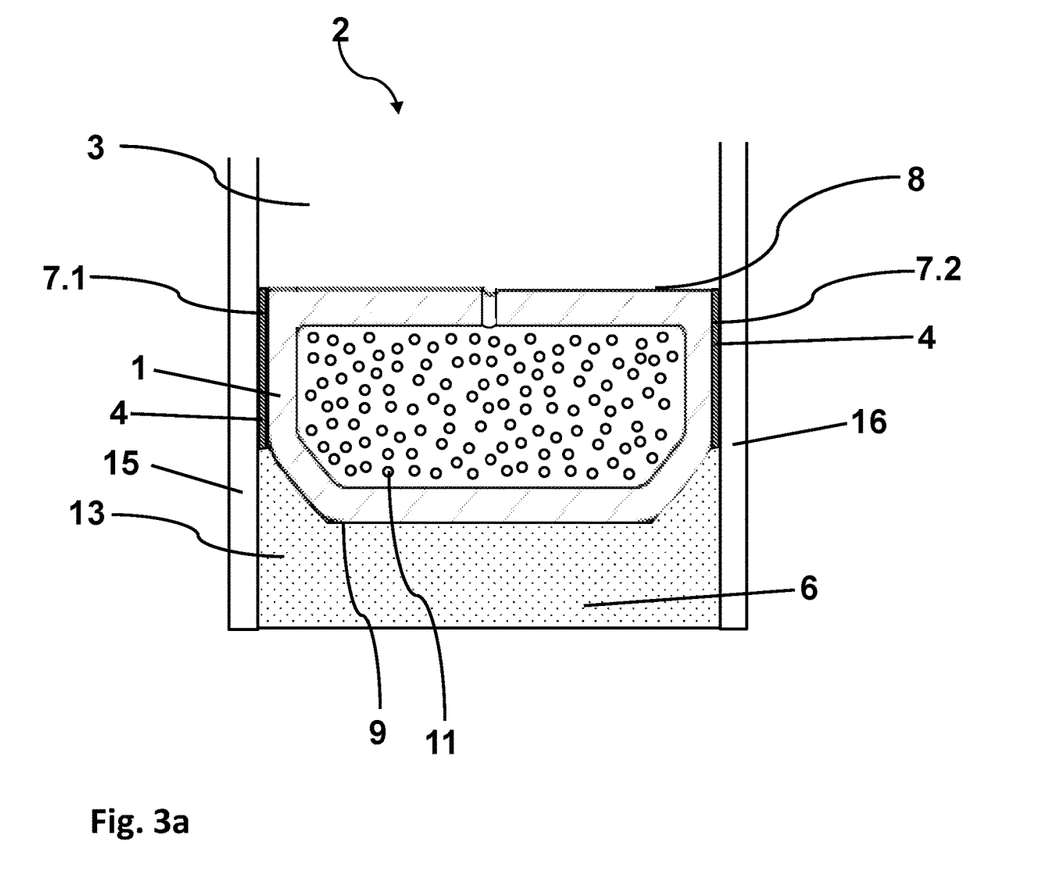
Figure 3B:
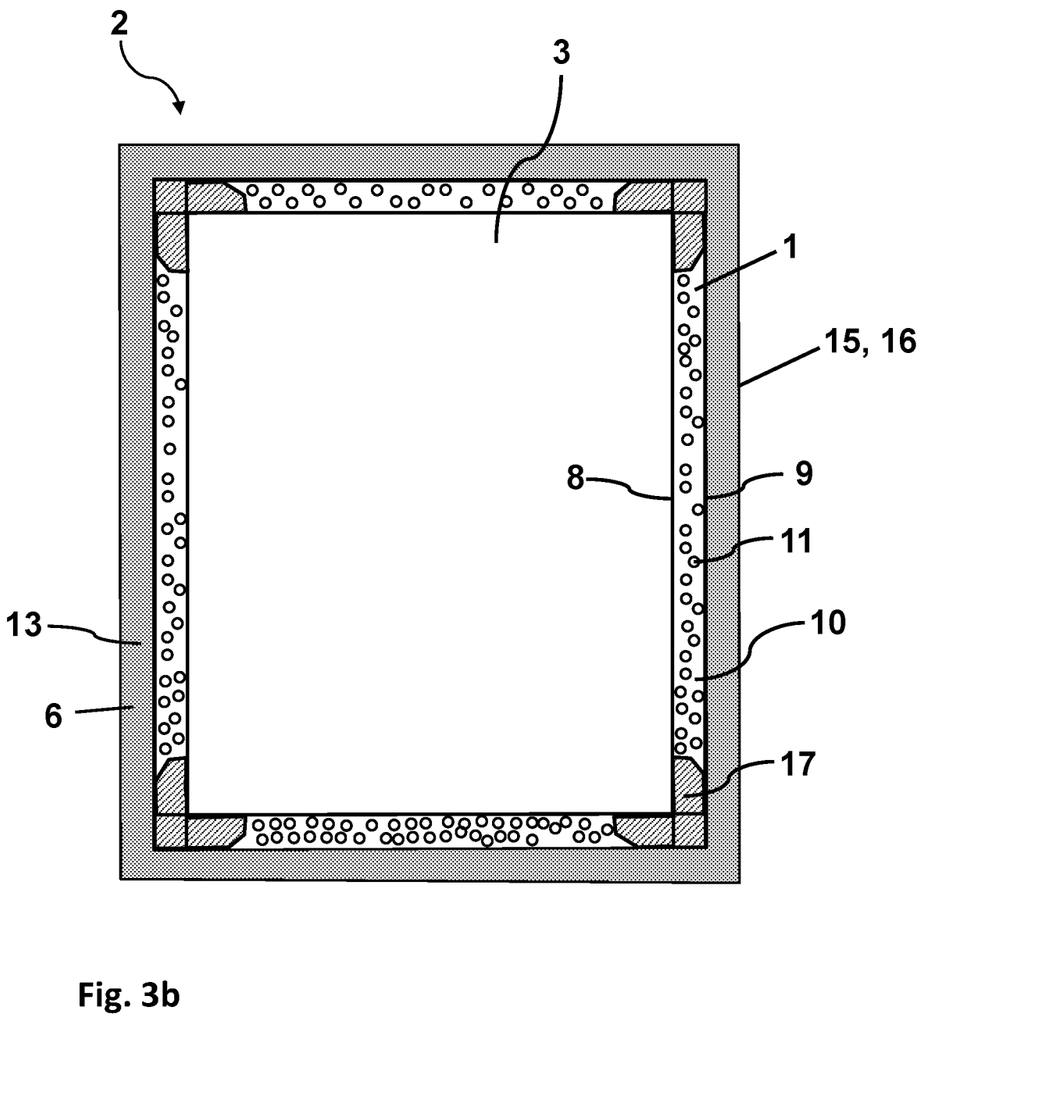

FIGS. 3a and 3b depict an insulated glazing 2 with the spacer 1 according to the invention of FIG. 1, wherein the gas- and vapor-tight barrier film 14 is not shown in detail. FIG. 3a depicts a cross-section of the insulated glazing 2, while FIG. 3b is a plan view. FIG. 3b depicts an overall view of the insulated glazing 2 of FIG. 3a. The spacers 1 are connected to one another at the corners of the insulated glazing 2 by corner connectors 17. The spacer 1 according to the invention is attached circumferentially between a first pane 15 and a second pane 16 via a sealant 4. The sealant 4 connects the pane contact surfaces 7.1 and 7.2 of the spacer 1 to the panes 15 and 16. The cavity 10 is filled with a desiccant 11. Molecular sieve is used as the desiccant 11. The glazing interior 3 adjacent the glazing interior surface 8 of the spacer 1 is defined as the space delimited by the panes 15, 16 and the spacer 1. The outer interpane space 13 adjacent the outer surface 9 of the spacer 1 is a strip-shaped circumferential section of the glazing, which is delimited by one side each of the two panes 15, 16 and on another side by the spacer 1, and its fourth edge is open. The glazing interior 3 is filled with argon. A sealant 4 that seals the gap between pane 15, 16 and spacer 1 is introduced in each case between one pane contact surface 7.1 or 7.2 and the respective adjacent pane 15 or 16. The sealant 4 is polyisobutylene. In the outer interpane space 13, an outer seal 6 that serves to bond the first pane 19 and the second pane 20 is applied on the outer surface 9. The outer seal 6 is made of polysulfide. The outer seal 6 ends flush with the pane edges of the first pane 15 and the second pane 16.

Figure 4:
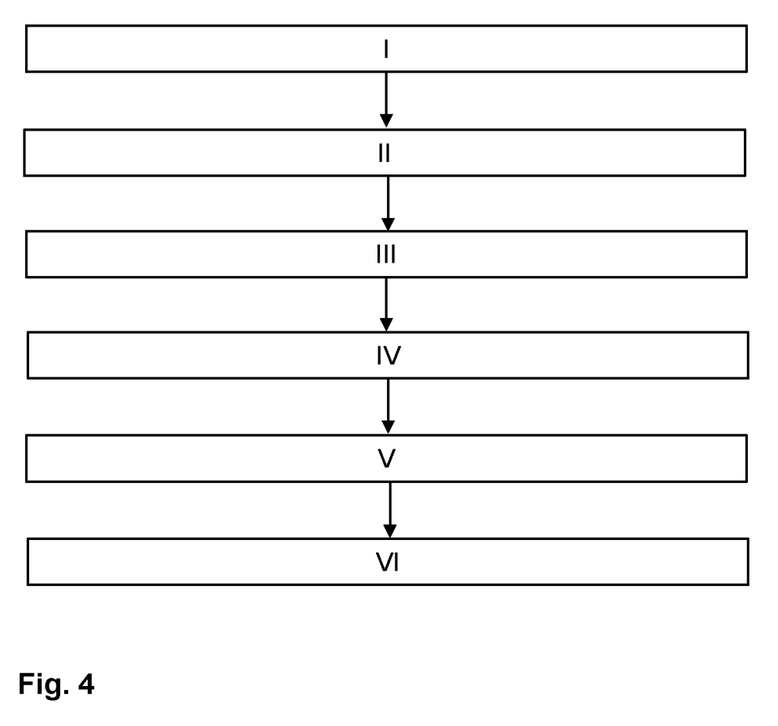

FIG. 4 depicts a flow chart of a possible embodiment of the method according to the invention for producing a spacer 5 comprising the steps:
- I Providing a mixture of at least thermoplastic polymer as base material, elastomeric additive, reinforcing agent, and foaming agent,
- II Melting the mixture in an extruder at a temperature of 200° C. to 240° C.,
- III Decomposing the foaming agent under the effect of temperature,
- IV Shaping the melt through a mold to form a spacer main body,
- V Stabilizing the spacer, and
- VI Cooling the spacer.

Preferably, in step IV, a gas- and vapor-tight barrier film is attached by adhesive bonding to the outer surface and at least to sub-regions of the pane contact surfaces.

LIST OF REFERENCE CHARACTERS 1 spacer
2 insulated glazing
3 glazing interior
4 sealant
5 polymeric main body
6 outer seal
7 pane contact surfaces
7.1 first pane contact surface
7.2 second pane contact surface
8 glazing interior surface
9 outer surface
10 cavity
11 desiccant
12 openings
13 outer interpane space
14 gas- and vapor-tight barrier film
15 first pane
16 second pane
17 corner connector

The invention claimed is:

1. A spacer for insulated glazings comprising a polymeric main body comprising two pane contact surfaces, a glazing interior surface, an outer surface, and a cavity,
wherein
the polymeric main body contains a thermoplastic polymer as a base material at a proportion of 30.0 wt.-% to 70.0 wt.-%, as an elastomeric additive, a thermoplastic elastomer, and/or a thermoplastic terpolymer having an elastomeric component at a proportion of 0.5 wt.-% to 20.0 wt.-% in total, and a reinforcing agent at a proportion of 20.0 wt.-% to 45.0 wt.-%,
the thermoplastic polymer as a base material comprises a styrene-based polymer, and
the polymeric main body has a foamed pore structure.

2. The spacer according to claim 1, wherein the elastomeric additive is a thermoplastic elastomer from the group of thermoplastic polyurethanes (TPU) and/or the group of thermoplastic styrene block copolymers (TPS) and is added at a proportion of 0.3 wt.-% to 5.0 wt.-%.

3. The spacer according to claim 1, wherein the elastomeric additive is a thermoplastic terpolymer having an elastomeric component comprising an acrylonitrile-butadiene-styrene copolymer (ABS).

4. The spacer according to claim 1, wherein the elastomeric additive is a thermoplastic terpolymer having an elastomeric component comprising an acrylonitrile-styrene-acrylate (ASA).

5. The spacer according to claim 1, wherein the thermoplastic polymer of the base material comprises styrene-acrylonitrile (SAN).

6. The spacer according to claim 1, wherein the elastomeric additive contains no polypropylene.

7. The spacer according to claim 1, wherein the polymeric main body is foamed by a foaming agent.

8. The spacer according to claim 7, wherein the foaming agent comprises a blowing agent and a carrier material and the carrier material contains no polypropylene.

9. The spacer according to claim 1, wherein the polymeric main body includes pores having a pore size of 10 μm to 100 μm.

10. The spacer according to claim 1, wherein the reinforcing agent is reinforcing fibers.

11. An insulating glazing comprising a spacer according to claim 1, a first pane and a second pane, wherein the first pane is attached to a first pane contact surface of the two pane contact surfaces of the spacer via a sealant and the second pane is attached to a second pane contact surface of the two pane contact surfaces of the spacer via a sealant.

12. A method for producing a spacer according to claim 1, comprising:
a) providing a mixture of at least a thermoplastic polymer as base material, elastomeric additive, reinforcing agent, and foaming agent,
b) melting the mixture in an extruder at a temperature of 200° C. to 240° C.,
c) decomposing the foaming agent under the effect of temperature,
d) pressing the melt is pressed through a mold and obtaining a spacer,
e) stabilizing the spacer, and
f) cooling the spacer,
wherein, in step a), the thermoplastic polymer as a base material comprises a styrene-based polymer.

13. The method according to claim 12, wherein the thermoplastic polymer of the base material is styrene-acrylonitrile and the elastomeric additive is a thermoplastic elastomer from the group of thermoplastic polyurethanes (TPU) and/or the group of thermoplastic styrene block copolymers (TPS) and is added at a proportion of 0.3 wt.-% to 5.0 wt.-%.

14. The method according to claim 12, wherein the thermoplastic polymer of the base material is styrene-acrylonitrile and the elastomeric additive is acrylonitrile-butadiene-styrene copolymer (ABS) and is added at a proportion of 4.0 wt.-% to 20.0 wt.-%.

15. The method according to claim 12, wherein the thermoplastic polymer of the base material is styrene-acrylonitrile and the elastomeric additive is acrylonitrile-styrene-acrylate (ASA) and is added at a proportion of 4.0 wt.-% to 20.0 wt.-%.

16. The spacer according to claim 2, wherein the thermoplastic elastomer is added at a proportion of 1.5 wt.-% to 2.5 wt.-%.

17. The spacer according to claim 3, wherein the acrylonitrile-butadiene-styrene copolymer (ABS) is added at a proportion of 4.0 wt.-% to 20.0 wt.-%.

18. The spacer according to claim 4, wherein the acrylonitrile-styrene-acrylate (ASA) is added at a proportion of 4.0 wt.-% to 20.0 wt.-%.

19. The spacer according to claim 6, wherein the elastomeric additive contains no olefin-based thermoplastic elastomers (TPO).

20. The spacer according to claim 7, wherein the foaming agent is added in an amount of 0.5 wt.-% to 3.0 wt.-%.

* * * * *